(12) United States Patent
Carlbaum Ekholm et al.

(10) Patent No.: US 12,524,887 B2
(45) Date of Patent: Jan. 13, 2026

(54) ESTIMATING BOUNDARIES OF AN OBJECT OF INTEREST (OOI) WITHIN A THREE-DIMENSIONAL MODEL OF AN AREA

(71) Applicant: Telefonaktiebolaget LM Ericsson (publ), Stockholm (SE)

(72) Inventors: Erik Carlbaum Ekholm, Johanneshov (SE); Volodya Grancharov, Solna (SE); Manish Sonal, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 350 days.

(21) Appl. No.: 18/030,391

(22) PCT Filed: Oct. 8, 2020

(86) PCT No.: PCT/EP2020/078324
§ 371 (c)(1),
(2) Date: Apr. 5, 2023

(87) PCT Pub. No.: WO2022/073614
PCT Pub. Date: Apr. 14, 2022

(65) Prior Publication Data
US 2023/0386047 A1    Nov. 30, 2023

(51) Int. Cl.
*G06T 7/13*    (2017.01)
*B64U 10/00*   (2023.01)
(Continued)

(52) U.S. Cl.
CPC ............... *G06T 7/13* (2017.01); *B64U 10/00* (2023.01); *G06T 7/246* (2017.01); *G06T 7/73* (2017.01);
(Continued)

(58) Field of Classification Search
CPC ............. G06T 7/13; G06T 7/246; G06T 7/73; G06T 2207/10028; G06T 2207/10032;
(Continued)

(56) References Cited

U.S. PATENT DOCUMENTS

| 10,311,565 B2 | 6/2019 | Terry | |
| 2020/0174129 A1* | 6/2020 | Abdelkader | G06V 20/17 |
| 2025/0119645 A1* | 4/2025 | Wali | H04N 23/68 |

FOREIGN PATENT DOCUMENTS

| WO | WO2024144926 | * 7/2024 | G01C 21/30 |

OTHER PUBLICATIONS

Changbin You; Joint 2-D-3-D Traffic Sign Landmark Data Set for Geo-Location Using Mobile Laser Scanning Data; Jul. 2019; IEEE; vol. 20 Issue 7; pp. 2550-2565 (Year: 2019).*
(Continued)

*Primary Examiner* — Jerome Grant, II
(74) *Attorney, Agent, or Firm* — Rothwell, Figg, Ernst & Manbeck, P.C.

(57) ABSTRACT

A method for estimating boundaries of an OOI. The method includes obtaining a first point cloud comprising a set of N points. The method also includes obtaining a set of K images. The method also includes, for each point included in the set of N points, identifying, for each one of the K images, the point's location within a 2D space corresponding to the image, thereby obtaining, for each point included in the set of N point, K location identifiers. The method also includes, for each point included in the set of N points, determining a motion metric for the point using the K location identifiers for the point. The method also includes using the N motion metrics to form a subset of the N points. The method also includes, for each point included in the subset of points, obtaining a location identifier for the point. The method also includes using the location identifiers to estimate a center of the OOI and then using the estimated center of the OOI to identify boundaries for the OOI.

20 Claims, 11 Drawing Sheets

(51) Int. Cl.
  *G06T 7/246* (2017.01)
  *G06T 7/73* (2017.01)
  *B64U 101/30* (2023.01)
(52) U.S. Cl.
  CPC ............. *B64U 2101/30* (2023.01); *G06T 2207/10028* (2013.01); *G06T 2207/10032* (2013.01); *G06T 2207/30244* (2013.01)
(58) Field of Classification Search
  CPC .......... G06T 2207/30244; G06T 2207/30184; G06T 7/174; G06T 7/194; G06T 7/11; B64U 10/00; B64U 2101/30
  USPC ....................................................... 382/107
  See application file for complete search history.

(56) References Cited

OTHER PUBLICATIONS

International Search Report and Written Opinion dated Jun. 30, 2021 issued in International Patent Application No. PCT/EP2020/078324 (9 pages).
You, C., et al., "Joint 2-D-3-D Traffic Sign Landmark Data Set for Geo-Localization Using Mobile Laser Scanning Data," IEEE Transactions On Intelligent Transportation Systems, vol. 20, No. 7, Jul. 2019, XP011732322 (16 pages).

\* cited by examiner

ESTIMATING BOUNDARIES OF AN OBJECT OF INTEREST (OOI) WITHIN A THREE-DIMENSIONAL MODEL OF AN AREA

CROSS REFERENCE TO RELATED APPLICATIONS

This application is a 35 U.S.C. § 371 National Stage of International Patent Application No. PCT/EP2020/078324, filed Oct. 8, 2020.

TECHNICAL FIELD

Disclosed are embodiments related to estimating boundaries of an object of interest (OOI) within a three-dimensional (3D) model of an area.

BACKGROUND

An unmanned aerial vehicle (UAV) (a.k.a., "drone") equipped with a camera can be used to obtain images of an area of interest that contains an object of interest (e.g., a telecommunications cell tower or other OOI) and these images can then be used to generate a three-dimensional (3D) model of the area, including the OOI. For instance, the drone typically orbits the OOI with a camera pointing down at 45° and the camera is used to obtain many images of the OOI from many different angles. These images are then used to form a point cloud. The most popular approach for generating such a point cloud is to use Structure from Motion (SfM) technology (e.g., SfM technology from Pix4D (www.pix4d.com), COLMAP (see colmap.github.io/), etc.).

SUMMARY

Certain challenges presently exist. For instance, the resulting point cloud captures a large part of an area surrounding the OOI. Because such a resulting point cloud may consist of tens of millions of points, it is challenging to automatically extract from the point cloud the points belonging to the OOI, as opposed to other points belonging to, for example, a background object or the ground. The problem of extracting the set of 3D points that belongs to the OOI from a large point cloud could be defined as estimating the boundaries of the OOI. In one aspect, the boundaries can be estimated by: 1) estimating the coordinates corresponding to the center of z-axis-aligned-OOI on the XY plane $\{c\_x, c\_y\}$, and 2) identifying a set of offsets from the center, along the z axis Offset(z) that separates the OOI from the rest of the visual scene.

Accordingly, in one aspect there is provided a method for estimating boundaries of an OOI. The method includes obtaining a first point cloud comprising a set of N points, each one of the N points having a location in a three-dimensional (3D) space. The method also includes obtaining a set of K images, each of the K images comprising an image of the OOI from a unique position relative to the OOI, wherein each of the K images has a corresponding two-dimensional (2D) space, and further wherein, for each one of the K images, each point included in the set of N points has a location within the 2D space corresponding to the image. The method also includes, for each point included in the set of N points, identifying, for each one of the K images, the point's location within the 2D space corresponding to the image, thereby obtaining, for each point included in the set of N points, K location identifiers, wherein each one of the K location identifiers identifies the point's location in one of the K images. The method also includes, for each point included in the set of N points, determining a motion metric for the point using the K location identifiers for the point, thereby obtaining N motion metrics. The method also includes using the N motion metrics to form a subset of the N points, the subset containing P of the N points, where $P = X \times N$, where $X > 0$ and $X < 1$. The method also includes, for each point included in the subset of P points, obtaining a location identifier for the point, wherein the location identifier identifies a point in a plane, thereby obtaining P location identifiers. The method also includes using the P location identifiers to estimate a center of the OOI and then using the estimated center of the OOI to identify boundaries for the OOI.

In another aspect there is provided a computer program comprising instructions. When the instructions are executed by processing circuitry of an apparatus, the instructions cause the apparatus to perform the above described method for estimating boundaries of an OOI. In one embodiment, there is provided a carrier containing the computer program, wherein the carrier is one of an electronic signal, an optical signal, a radio signal, and a computer readable storage medium.

In another aspect there is provided an apparatus for estimating boundaries of an OOI. The apparatus is configured to obtain a first point cloud comprising a set of N points, each one of the N points having a location in a three-dimensional (3D) space. The apparatus is also configured to obtain a set of K images, each of the K images comprising an image of the OOI from a unique position relative to the OOI, wherein, for each one of the K images, each point included in the set of N points has a location within a 2D space corresponding to the image. The apparatus is also configured to, for each point included in the set of N points, identify, for each one of the K images, the point's location within the 2D space corresponding to the image, thereby obtaining, for each point included in the set of N points, K location identifiers, wherein each one of the K location identifiers identifies the point's location in one of the K images. The apparatus is also configured to, for each point included in the set of N points, determine a motion metric for the point using the K location identifiers for the point, thereby obtaining N motion metrics. The apparatus is also configured to use the N motion metrics to form a subset of the N points, the subset containing P of the N points, where $P = X \times N$, where $X > 0$ and $X < 1$. The apparatus is also configured to, for each point included in the subset of P points, obtain a location identifier for the point, wherein the location identifier identifies a point in a plane, thereby obtaining P location identifiers. The apparatus is also configured to use the P location identifiers to estimate a center of the OOI and then use the estimated center of the OOI to identify boundaries for the OOI.

In another aspect there is provided an apparatus for estimating boundaries of an OOI, where the apparatus includes processing circuitry and a memory. The memory contains instructions executable by the processing circuitry, whereby the apparatus is operative to perform the methods disclosed herein, such as the above described method for estimating boundaries of an OOI.

The embodiments disclosed herein are advantageous in that, with respect to the modelling of telecommunication equipment (e.g., a cell tower) the embodiments provide a more accurate site design and installation documentation, site implementation document (SID), Bill of Materials (BoM), etc.

BRIEF DESCRIPTION OF THE DRAWINGS

The accompanying drawings, which are incorporated herein and form part of the specification, illustrate various embodiments.

DETAILED DESCRIPTION

This disclosure focuses on a use case in which the object of interest (OOI) is a piece of telecommunication equipment (e.g., a cell tower). This disclosure, however, is applicable to any use case.

As noted above, the process of extracting the set of 3D points that belong to the OOI from a large point cloud can include estimating the boundaries of the OOI. In one aspect, the boundaries can be estimated by: 1) estimating the coordinates corresponding to the center of z-axis-aligned-OOI on the X-Y plane $\{c\_x, c\_y\}$, and 2) identifying a set of offsets from the center, along the z axis Offset(z) that separates the OOI from the rest of the visual scene.

Figure 11:
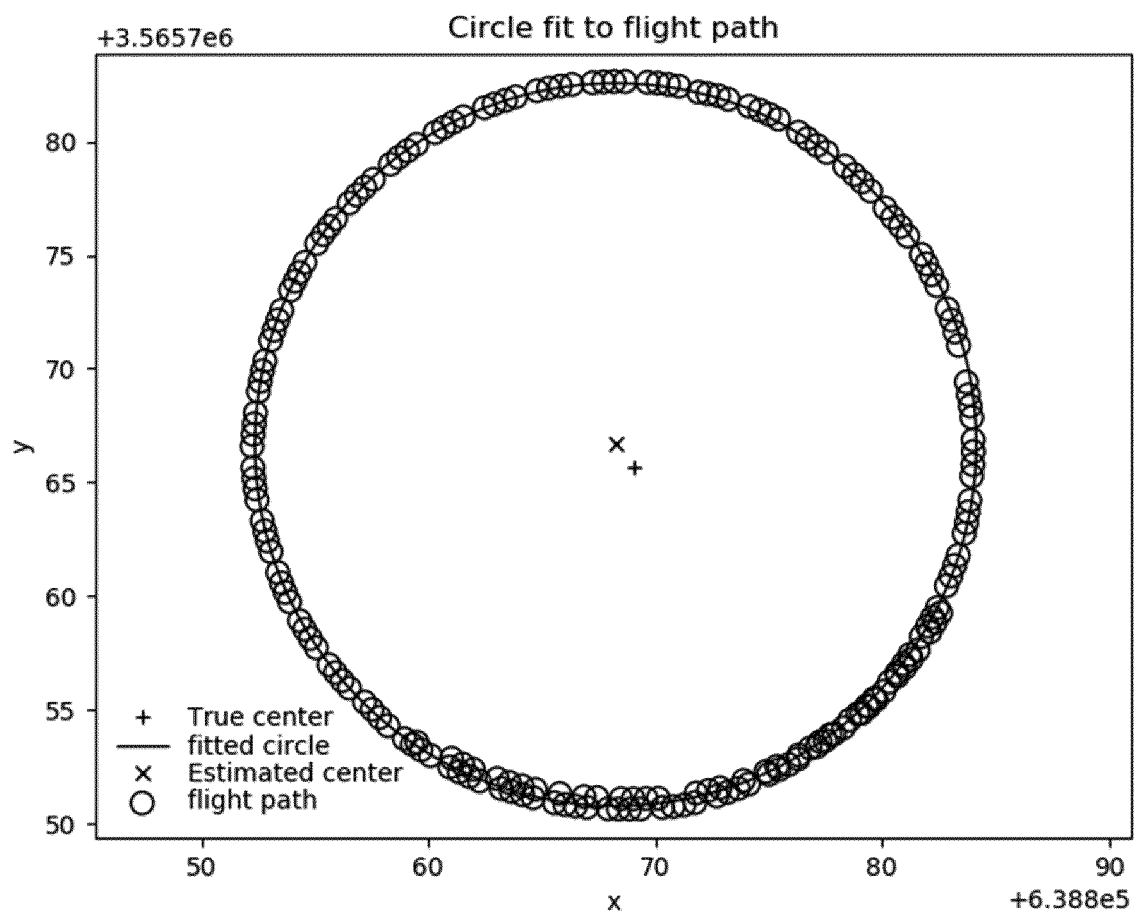
FIG. 11 illustrates an example drone flight path around an OOI.

Estimation of the center of the OOI is a non-trivial problem. Solutions to a related problem of estimation of the center of a drone orbit do not have the required accuracy (see FIG. 11). The dots in FIG. 11 illustrate drone camera positions (in the X-Y plane) in the coordinate system of the point cloud. There is no automatic method for estimation of the center of the OOI described in the literature or implemented in commercial solutions. This disclosure addresses this issue and provides a mechanism to, among other things, estimate the "center" of the OOI.

High Level Architecture

Figure 1:
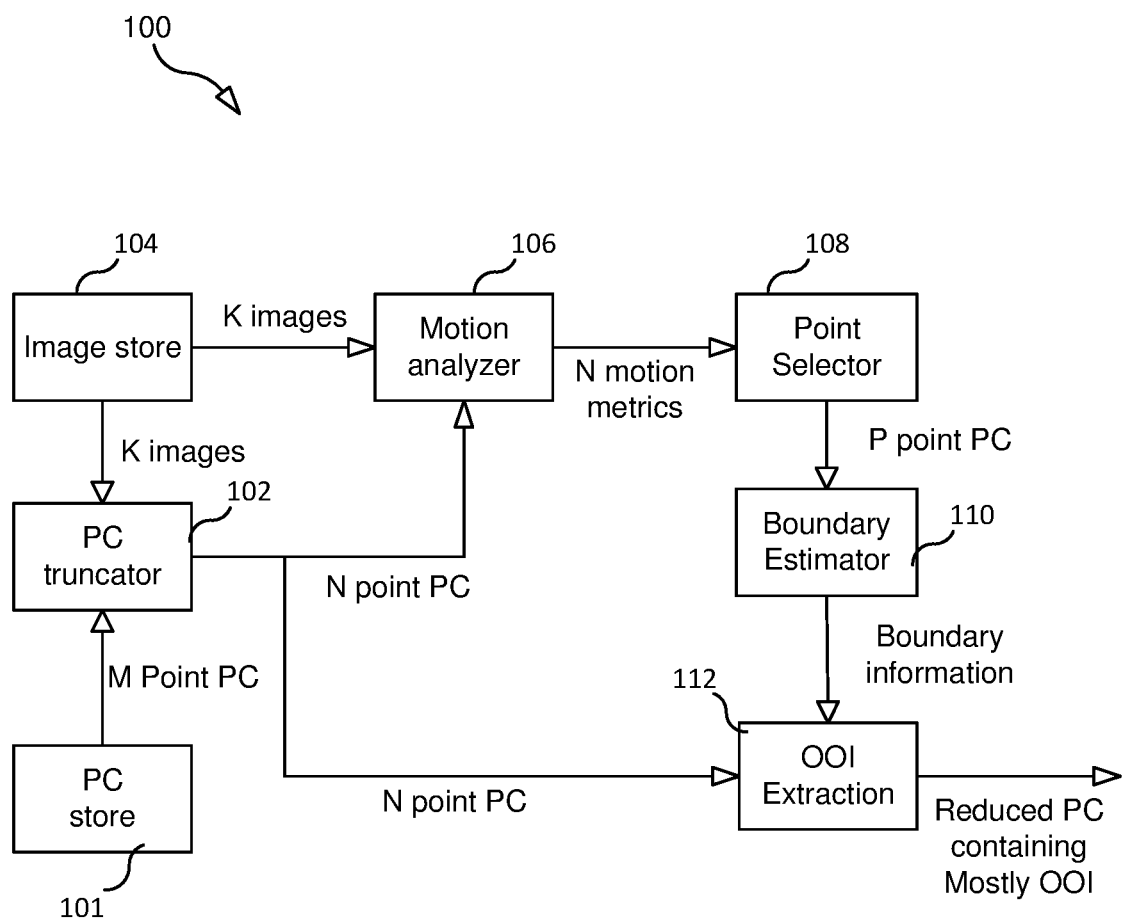
FIG. 1 illustrates a block diagram of a system according to some embodiments.
Figure 2:
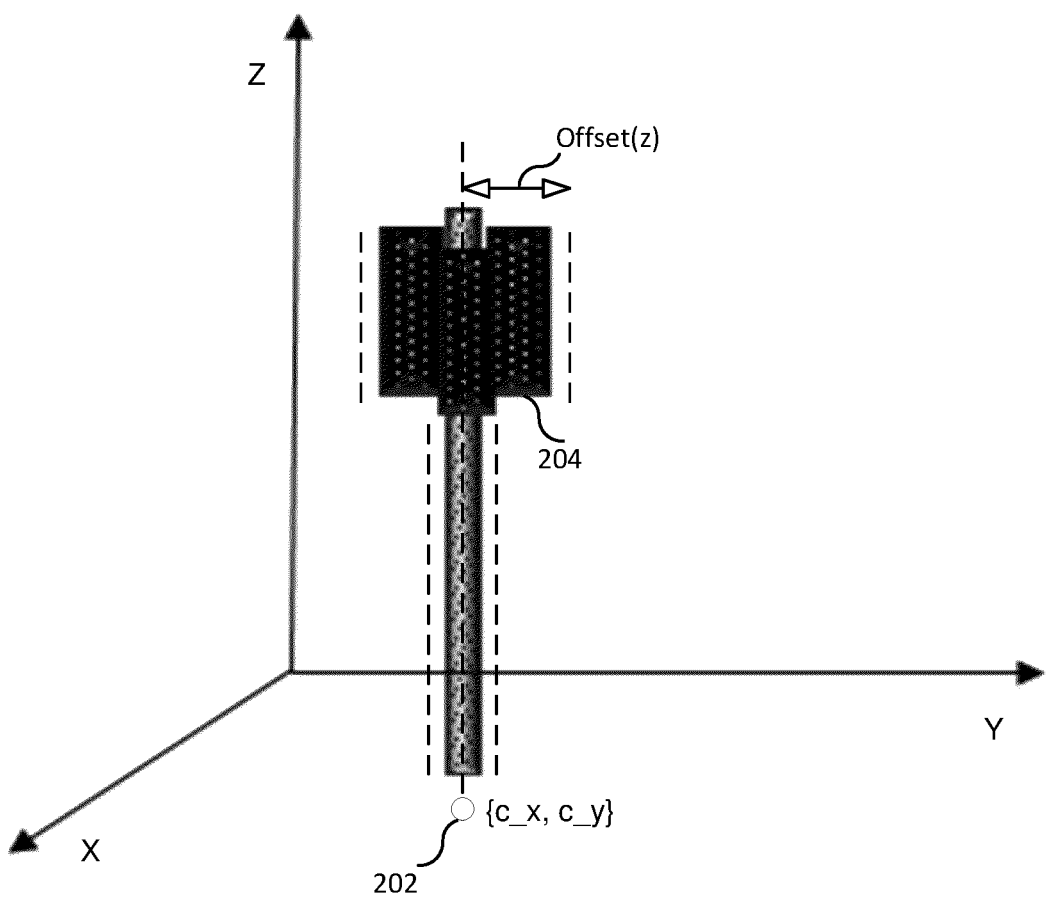
FIG. 2 illustrates boundary information for an OOI.

FIG. 1 illustrates a high-level functional block-diagram of a system 100 according to an embodiment. Advantageously, system 100 is configured to automatically produce boundary information for an OOI. In one aspect, as illustrated in FIG. 2, the boundary information includes: i) coordinates of a center point 202 for an OOI 204 (which in this example is an antenna tower), where the center point lies on an X-Y plane, and ii) a set of offset values (Offset(z)), where each offset value is associated with a position (denoted z) along an axis perpendicular to the X-Y plane. This boundary information can then be used to extract relevant points from a point cloud thereby producing a reduced point cloud (e.g., extracting from the point cloud points corresponding to the OOI, thereby producing a reduced point cloud that includes the points corresponding to the OOI, but does not include non-relevant points).

As shown in FIG. 1, in one embodiment system 100 includes a point cloud (PC) storage unit 101 for storing a point cloud consisting of M points. As subset of the M points correspond to an OOI. System 100 further includes a point cloud truncation unit 102 ("PC truncator" 102) that forms a truncated point cloud consisting of N points, where a subset of the N points correspond to the OOI. Preferably N<<M. PC truncator 102 uses K images of the OOI to produce the truncated point cloud. A motion analyzer, for each point in the truncated point cloud, uses the K images to determine a motion metric for the point, thereby producing N motion metrics. A point selector 108 uses the N motion metrics to select a set of P points (i.e., to form a point cloud consisting of P points), wherein a subset of the P points corresponds to the OOI. Preferably P=X % of N. A boundary estimator 110 uses the P point PC to produce boundary information for the OOI (e.g., the above described center point and offset values). The boundary information is used by an OOI extraction unit 112 to produce a reduced point cloud, where essentially all of the points in the reduced point cloud correspond to the OOI.

Figure 3:
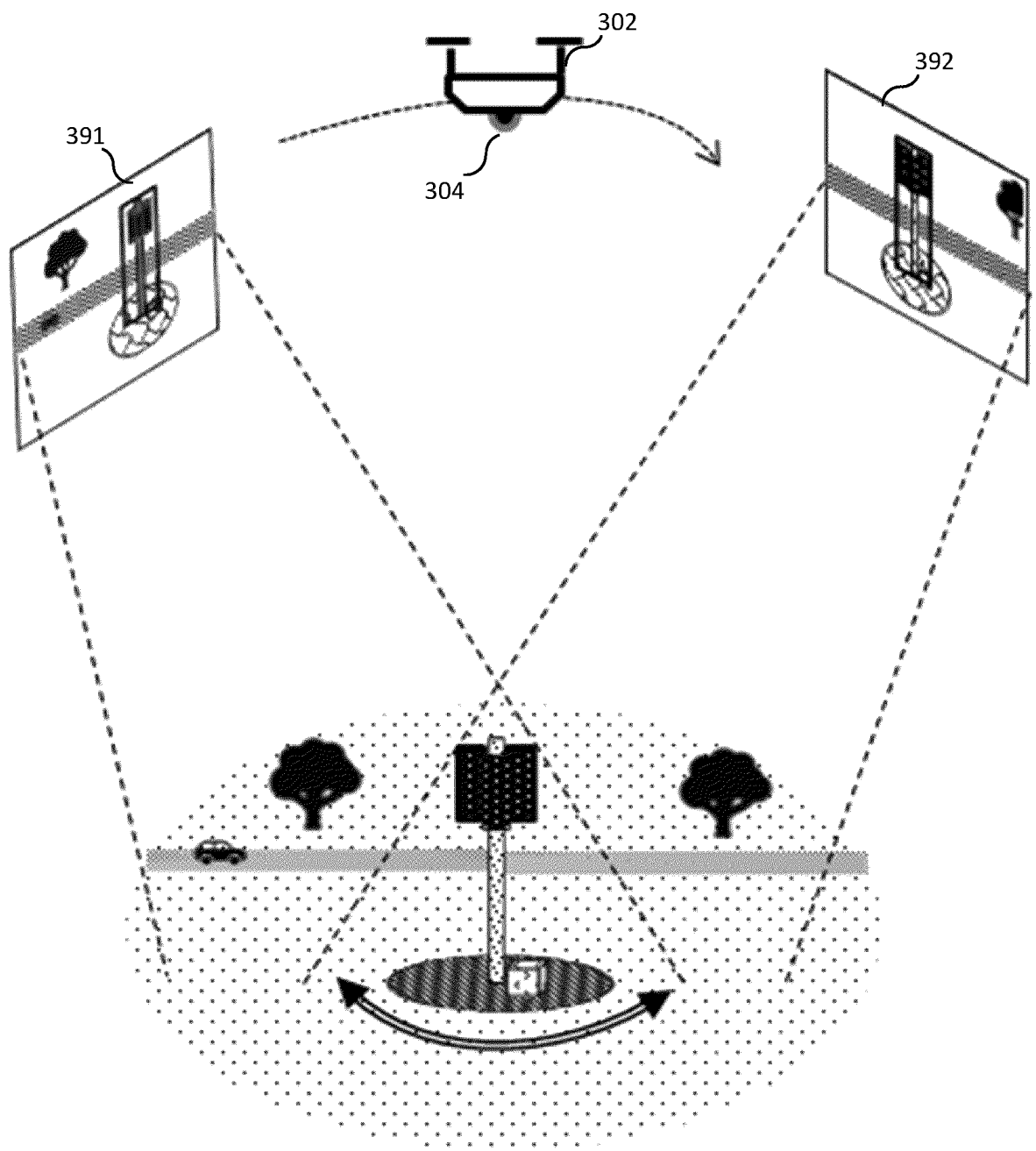
FIG. 3 illustrates an image acquisition process and an un-truncated point cloud.
Figure 4:
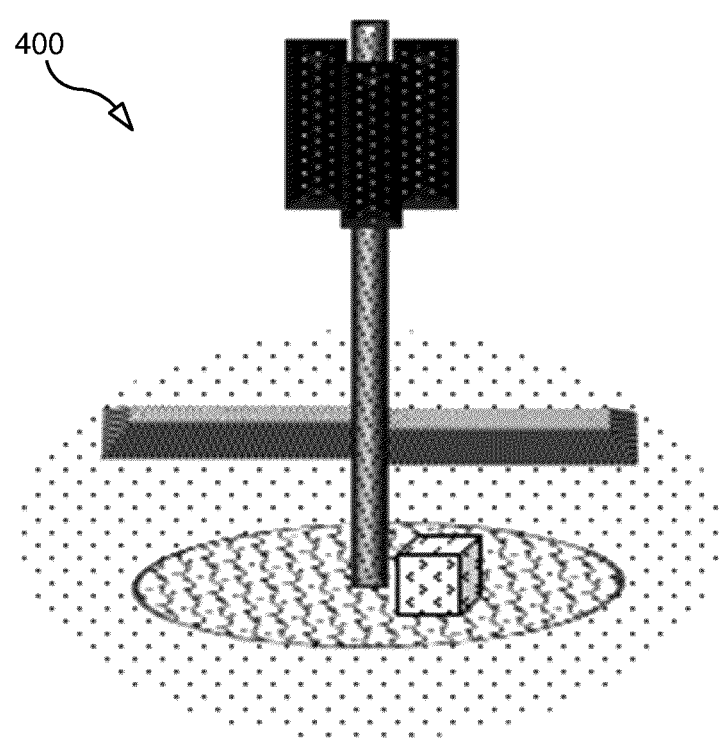
FIG. 4 illustrates a truncated point cloud.

FIG. 3 illustrates a process for producing the K images and for producing the initial point cloud (i.e., the M point PC). As shown in FIG. 3 images (e.g., images 391 and 392) are collected using a drone 302 equipped with a camera 304. As shown in FIG. 3, drone 302 orbits OOI 204, and at various different points on the orbital path (e.g., 80 to 160 different points on the orbital path) the camera 304 takes an image (thus, generally, 80 to 160 images are obtained). Generally, the drone is positioned at an altitude above the top of the OOI and the camera 304 points down at 45-60 degrees. Each image taken by the camera 304 may capture the entire OOI from top to bottom. These images can then be used to form the M point PC, represented by the dots in FIG. 3. FIG. 4 illustrates the truncated point could 400 (i.e., the N point PC). Comparing the dots in the un-truncated point cloud shown in FIG. 3 to the dots in truncated point cloud 400 shown in FIG. 4, one can see that N is less than M, but both point clouds include the important points—i.e., the points corresponding to the OOI 204.

In one embodiment, the truncated PC 400 shown in FIG. 4 is formed by using data identifying the orbit of drone 302 (see e.g., FIG. 11 for an example of such orbit data) and then: calculating a rough estimate of the center of OOI 204 based on the orbit data, formulating a volume encompassing the OOI based on the estimate of the center of the OOI, and then discarding all of the points outside of the volume. In another embodiment, truncation is achieved by determining the points in the M point PC that are "visible" from all of the K images. In other words, the truncated PC 400 includes only those points from the initial point cloud which once projected in image planes, remain in the image boundaries of each image. Accordingly, included in the truncated PC 400 are only those points in the M point PC that, for each one of the K images, when the point is projected on the image plane for the image the point is located within the image boundary. This process is illustrated in FIG. 5.

Figure 5:
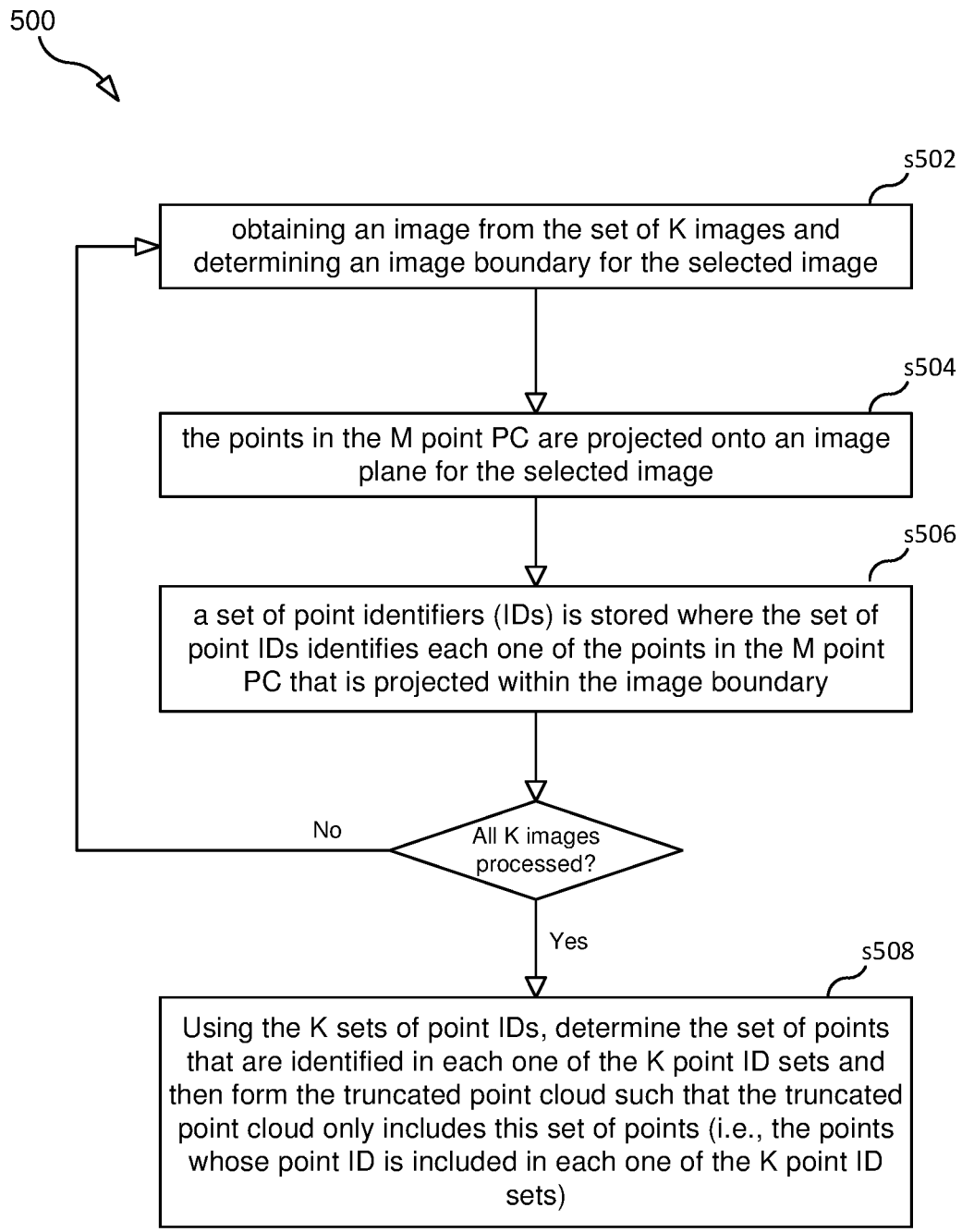
FIG. 5 is a process flow diagram illustrating a process, according to an embodiment, for generating a truncated point cloud.

As shown in FIG. 5, a process 500 for forming the truncated point cloud 400 includes the step of obtaining an image from the set of K images and determining an image boundary for the selected image (step s502). Next, the points in the M point PC are projected onto an image plane for the selected image (step s504). Next, a set of point identifiers (IDs) is stored where the set of point IDs identifies each one of the points in the M point PC that is projected within the image boundary (step s506). These steps are repeated until all of the images are processed. Once all of the images are processed, there will be K sets of point IDs (one set of point IDs for each image). Using the K sets of point IDs, the system determines the set of points that are identified in each one of the K point ID sets and then forms the truncated point cloud such that the truncated point cloud only includes this set of points (i.e., the points whose point ID is included in each one of the K point ID sets) (step s508).

Detailed Steps

Step a) to e) below give a general description of the process flow for estimating boundaries of an OOI. Steps a) to d), used to estimate the center of OOI.

a. Truncate an initial point cloud.
   b. Calculate movement between 3D points projected in consecutive images.
   c. Accumulate movement per 3D point over all images and threshold.
   d. Project points onto a XY-plane and estimate the center by averaging.
   e. Estimate OOI boundaries as offset from the center.

Figure 6:
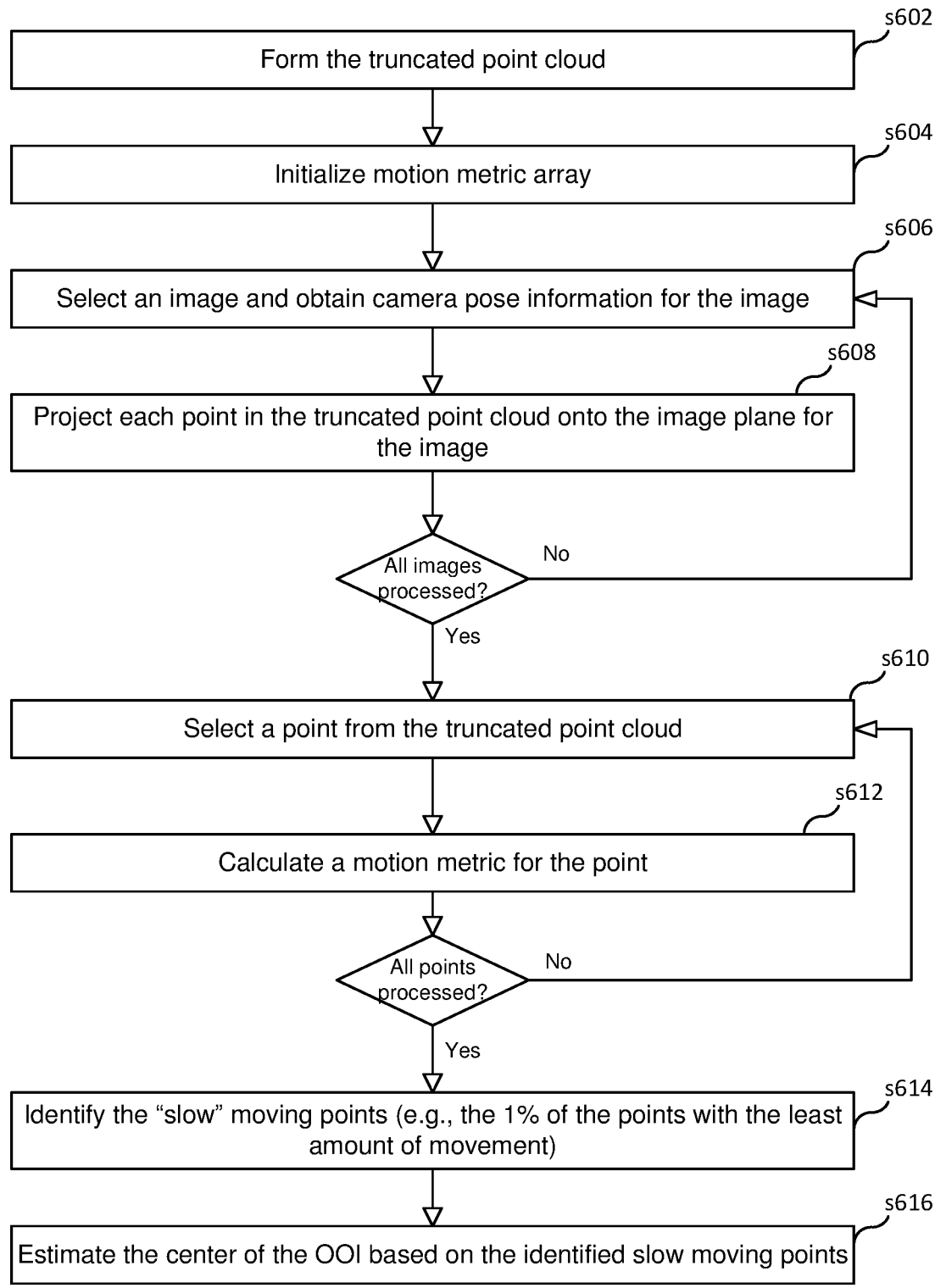
FIG. 6 is a process flow diagram illustrating a process, according to an embodiment, for estimating the center of an OOI.

Referring now to FIG. 6, FIG. 6 illustrates the steps of a process 600, according to one embodiment, for estimating the center of an OOI.

A point cloud with M points, generated by software such as Pix4D is loaded in the XYZ format and is represented as:

$$\begin{vmatrix} \{X_1, Y_1, Z_1\} \\ \{X_2, Y_2, Z_2\} \\ \ldots \\ \{X_M, Y_M, Z_M\} \end{vmatrix}.$$

This point cloud contains a large amount of terrain and unwanted points besides the OOI. The point cloud is truncated in step s602, as discussed above, to reduce the number of points but retain every point belonging to the OOI. That is, the N point PC 400 is formed, which has the form:

$$\begin{vmatrix} \{X_1, Y_1, Z_1\} \\ \{X_2, Y_2, Z_2\} \\ \ldots \\ \{X_N, Y_N, Z_N\} \end{vmatrix}.$$

An array of N values (d1, d2, ... dN) (also known as the "motion metric array") is initialized (step s604). For example, in step s604 each value of the array is set to zero (0). Each value in the array corresponds to one of the N points in the N point PC 400. Specifically, the value do is a motion metric for point n. In this embodiment, the motion metric for point n is a cumulative projected distance that point n has moved between each image.

In step s606 one of the K 2D images is selected and the camera pose information for the image (i.e., the orientation and positional information of the camera 304 when the image was taken) is obtained (step s606). Each one of the points from the N point PC 400 is then projected onto the image plane for this given image (s608). This means that projection [u, v] (point in the image plain in the image coordinate system) is calculated for every single point [X, Y, Z] from the truncated point cloud 400. This is described below.

The camera 304 pose in the point cloud coordinate system is defined by the position $CP=[CP_x, CP_y, CP_z]$ and orientation angles $[\omega, \varphi, \tau]$, which define a rotation matrix R as:

$$R = \begin{pmatrix} 1 & 0 & 0 \\ 0 & \cos(\omega) & -\sin(\omega) \\ 0 & \sin(\omega) & \cos(\omega) \end{pmatrix} \begin{pmatrix} \cos(\varphi) & 0 & \sin(\varphi) \\ 0 & 1 & 0 \\ -\sin(\varphi) & 0 & \cos(\varphi) \end{pmatrix} \begin{pmatrix} \cos(\tau) & -\sin(\tau) & 0 \\ \sin(\tau) & \cos(\tau) & 0 \\ 0 & 0 & 1 \end{pmatrix} \quad \text{(Eq. 1)}$$

Then a point (P_3D, P 3D=[X,Y,Z]) in the truncated point cloud 400 is projected in the camera coordinate system by: $P\_3D^* = R^T(P-CP)$, where $R^T$ is the transpose of R. Because point P_3D has three coordinates (X, Y, and Z) point P_3D may be referred to as a 3D point. That is, each point in truncated point cloud 400 is a 3D point.

Next P_3D*=[X*, Y*, Z*] is converted into 2D image coordinates [u*, v*] as:

$$[u^*, v^*] = \left[ -f\frac{X^*}{Z^*}, -f\frac{Y^*}{Z^*} \right] + [s_x, s_y], \quad \text{(Eq. 2)}$$

where f is the focal of the camera, and $[s_x, s_y]$ are intrinsic camera parameters (i.e., principal points).

This operation is performed for all of the N points in the truncated point cloud to produce a set 2D points in the 2D plane corresponding to the image k: {{u_k.1,v_k.1},{u_k.2, v_k.2}, ... ,{u_k.N,v_k.N}}, where point u_k.n,v_k.n is the point in the 2D image plane of image k for point n of the truncated point cloud 400.

Because this operation in step s608 is performed for each one of the K images, the following matrix of points is obtained after all K images are processed in step s608:

|         | Point 1        | Point 2        | ... | Point N        |
|---------|----------------|----------------|-----|----------------|
| image 1 | u_1.1, v_1.1   | u_1.2, v_1.2   | ... | u_1.N, v_1.N   |
| image 2 | u_2.1, v_2.1   | u_2.2, v_2.2   |     | u_2.N, v_2.N   |
| ...     | ...            | ...            |     | ......         |
| image K | u_K.1, v_K.1   | u_K.2, v_K.2   | ... | u_K.N, v_K.N   |

Accordingly, each image is associated with an array of N points, one for each point in the truncated point cloud 400. Likewise, each point n (n=1 to n=N) is associated with an array of K points, one for each of the K images.

For each point n (n=1 to n=N) in the truncated point cloud 400, a motion metric dn for the point is calculated using the array of K points with which the point n is associated (see steps s610 and s612). That is, in step s610 a point from the truncated point cloud is selected and in step s612 a motion metric for the point is calculated. For example, in one embodiment, the motion metric dn for point n is calculated as follows:

```
for (i=2; i<=K; i++) {
    dn = dn + ( (u_i.n − u_i-1.n)² + (v_i.n − v_i-1.n)² )^(1/2)
}
```

When completed, the motion metric dn contains information of the total distance point n has traveled on the projected planes. In some embodiments, the set of dn values are normalized to be between 0 and 1.

After the N motion metrics are calculated, the set of points in the bottom percentile in movement are identified (i.e., the "slow" moving points are selected) (step s614). That is, a set of P points is formed, wherein each point included in the set of P points is one of the slow moving points. For example, the points can be ordered from lowest to highest d value and the top 1% of the ordered points are then selected as the set of P points.

This set of low movement points (i.e., the set of P points) is then used to estimate the center of the OOI (step s616). More specifically, each point included in the set of P points is projected onto a plane parallel with the X-Y plane at a desired z-value producing a set of coordinates $\{\{x_1, y_1\}, \{x_2, y_2\}, \ldots, \{x_P, y_P\}\}$. The center of the cluster of these points is an estimate of the center of the OOI:

$$\text{estimated center: } \{c_x, c_y\} = \left\{ \frac{1}{P} \sum_{n=1}^{P} x_n, \frac{1}{P} \sum_{n=1}^{P} y_n \right\}.$$

Estimation of OOI Boundaries as Offset from the Center

Figure 7A:
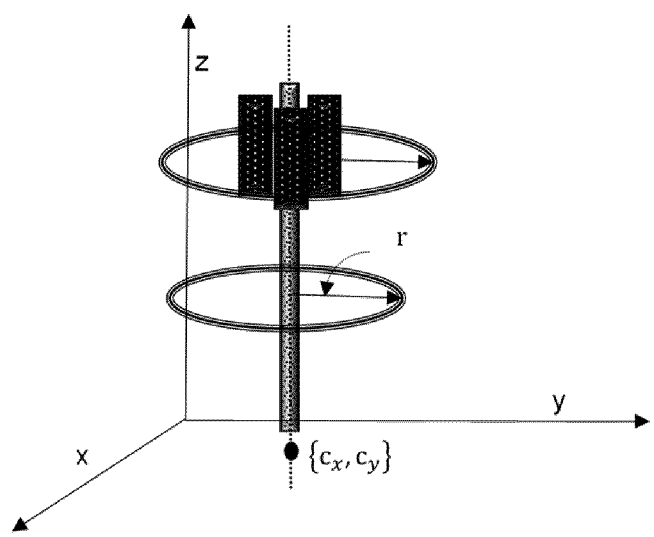
FIG. 7A illustrates measuring 3D point density as a function of a distance to a central axis.
Figure 7B:
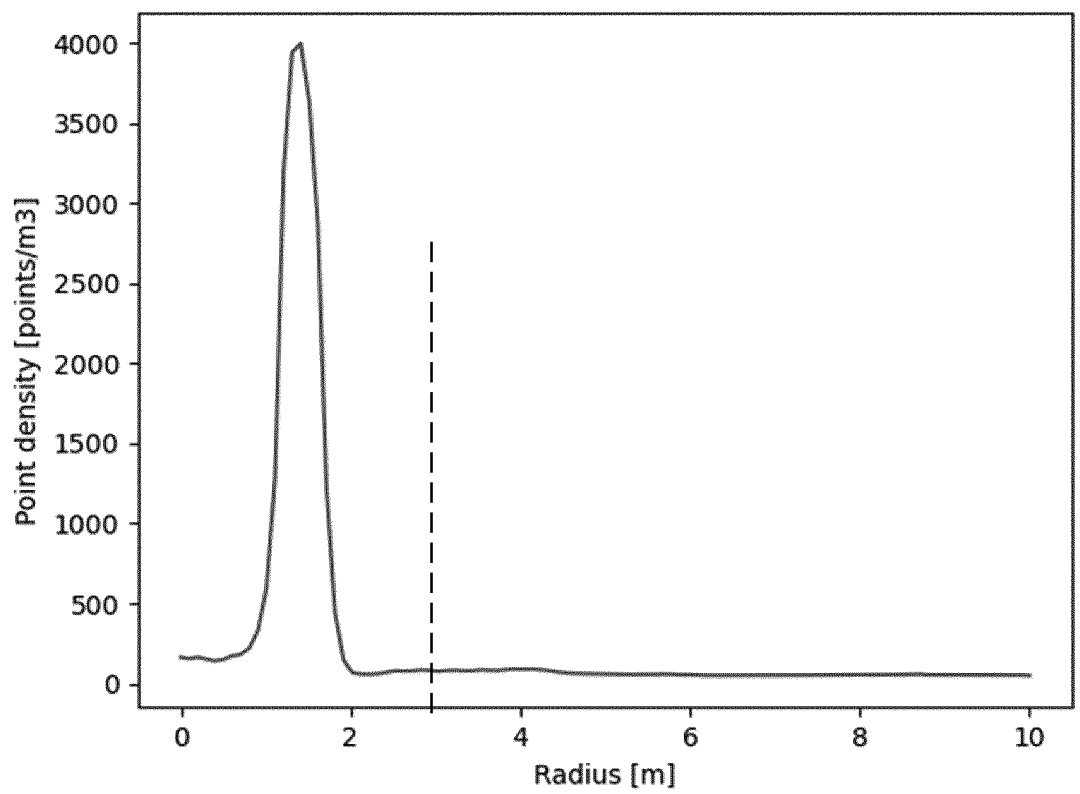
FIG. 7B illustrates example of density of 3D points as a function of the distance to the center.

To estimate the OOI boundaries, the density of the 3D points that fall in a square toroid with major radius r and side $r_T$ is calculated (see FIG. 7A). At a given height (given z value) the radius r gradually increases, capturing density of the point cloud further and further away from the center $\{c_x, c_y\}$. The point density is a good measure of the OOI structure (see FIG. 7B). The preferred thresholding logic that separates cell OOI from that background is to truncate at a pre-determined offset after the first density peak, see dashed line in FIG. 7B. Multiple density peaks can appear at larger distance from the center due to nearby objects (e.g. building/trees), therefore it is important to threshold after the first density peak.

Figure 8:
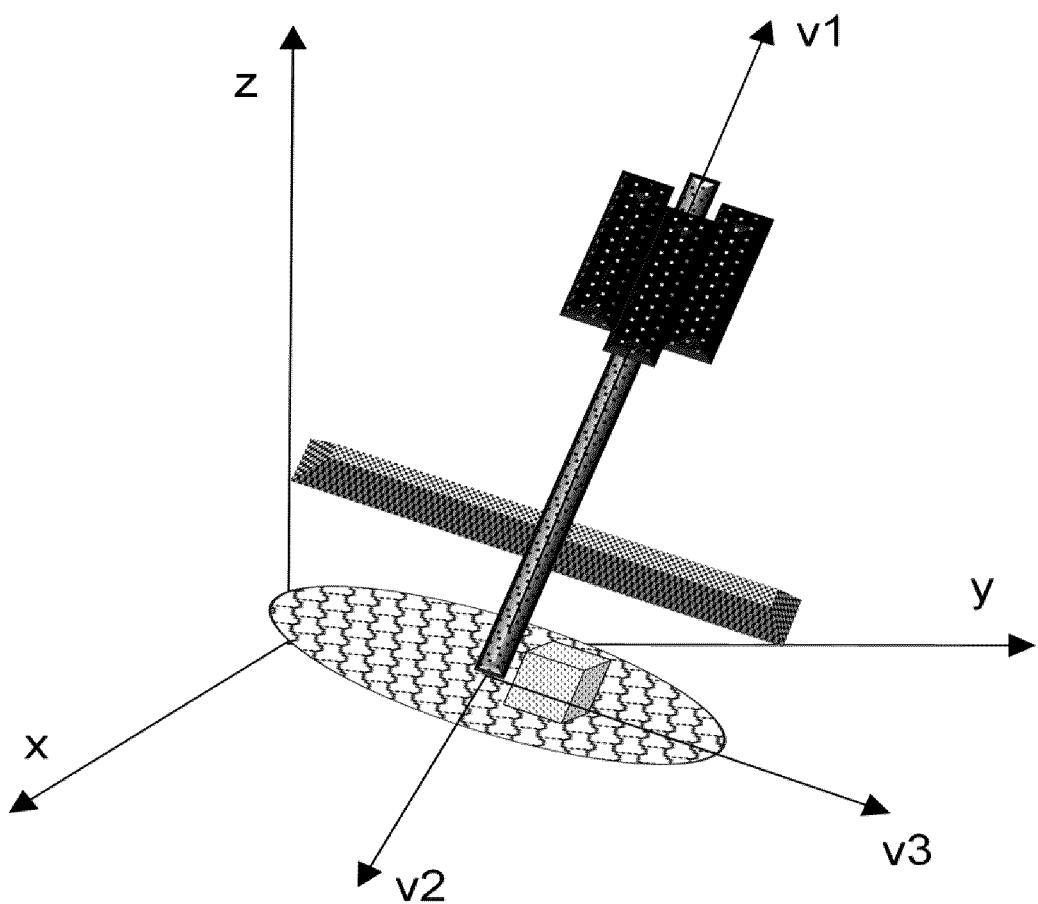
FIG. 8 illustrates a scenario where point cloud is aligned with the Z axis.

Referring back to FIG. 2, FIG. 2 shows that the OOI is oriented vertically along the z axis. For the scenarios when this is not the case, an additional alignment step may be executed. More specifically, a popular method for rotating a point cloud such that the direction of the OOI is along the Z axis is by using principal component analysis. The eigenvectors ($\vec{v}_1, \vec{v}_2, \vec{v}_3$) of covariance matrix of the point cloud is calculated which informs along which directions the point cloud is distributed (see FIG. 8). A rotation matrix R that rotates the point cloud such that vector $\vec{v}_1$ is aligned with the unit vector $\vec{z}$ is calculated by:

$$\vec{a} = \vec{v}_1 \times \vec{z}, A \stackrel{def}{=} \begin{pmatrix} 0 & -a_3 & a_2 \\ a_3 & 0 & -a_1 \\ -a_2 & a_1 & 0 \end{pmatrix} R_{\vec{v}_1 \to \vec{z}} = I_3 + A + A^2 \frac{1 - \vec{v}_1 \cdot \vec{z}}{\|\vec{a}\|^2}.$$

Figure 9:
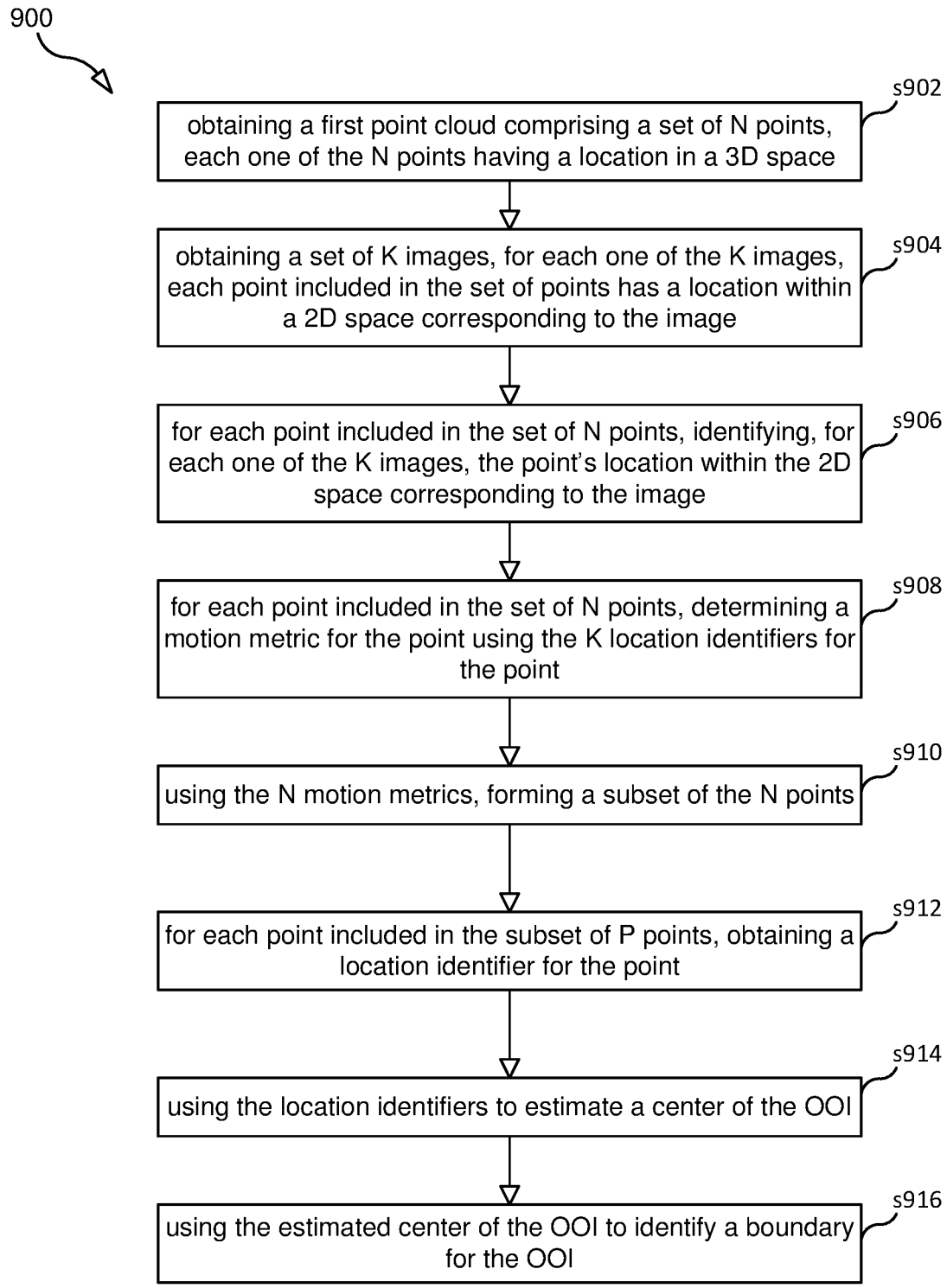
FIG. 9 is a process flow diagram illustrating a process, according to an embodiment, for estimating the boundaries of an OOI.

Referring now to FIG. 9, FIG. 9 is a flowchart illustrating a process 900, according to some embodiments, for estimating boundaries of OOI 204. Process 900 may begin in step s902.

Step s902 comprises obtaining a first point cloud comprising a set of N points, each one of the N points having a location in a three-dimensional (3D) space. This "first point cloud" corresponds to the above described truncated point cloud 400.

Step s904 comprises obtaining a set of K images, each of the K images comprising an image of the OOI from a unique position relative to the OOI, wherein, for each one of the K images, each point included in the set of N points has a location within a 2D space corresponding to the image (a.k.a., the image plane).

Step s906 comprises, for each point included in the set of N points, identifying, for each one of the K images, the point's location within the 2D space corresponding to the image, thereby obtaining, for each point included in the set of N points, K location identifiers, wherein each one of the K location identifiers identifies the point's location in one of the K images.

Step s908 comprises, for each point included in the set of N points, determining a motion metric for the point using the K location identifiers for the point, thereby obtaining N motion metrics.

Step s910 comprises using the N motion metrics, forming a subset of the N points, the subset containing P of the N points, where P=X×N, where X>0 and X<1 (e.g., P=0.01× N).

Step s912 comprises, for each point included in the subset of P points, obtaining a location identifier for the point, wherein the location identifier identifies a point in a plane, thereby obtaining P location identifiers.

Step s914 comprises using the P location identifiers to estimate a center of the OOI.

Step s916 comprises using the estimated center of the OOI to identify a boundary for the OOI.

In some embodiments, the step of forming the subset of P points comprises determining the points within the set of N points that have lowest motion metric.

In some embodiments process 900 further includes obtaining an initial point cloud comprising a set of M points and truncating the set of M points to establish the set of N points, thereby creating the first point cloud. In some embodiments the step of truncating the set of M points comprises: for each point included in the set of M points, determining, for each one of the K images, whether the point is located within the 2D space corresponding to the image; and removing from the set of M points all points that are not located within every one of the K 2D spaces, thereby forming a truncated point cloud.

In some embodiments the step of, for each point included in the set of the M points, determining, for each one of the K images, whether the point is located within the 2D space corresponding to the image comprises: determining whether a particular point included in the set of M points is located within the 2D space corresponding to a particular image included in the set of K images, and the step of determining whether the particular point is located within the 2D space corresponding to the particular image comprises: obtaining 3D location information specifying the location of the particular point in the 3D space; obtaining camera pose information identifying a camera pose associated with the particular image; obtaining intrinsic camera information, the intrinsic camera information comprising focal length information identifying a focal length; based on the 3D location information, the camera pose information, and the intrinsic camera information, obtaining 2D location information for the particular point; and using the obtained 2D location information for the particular point to determine whether the particular point is located within the 2D space corresponding to the particular image.

In some embodiments the 2D space corresponding to the particular image has a center point located at the coordinates Cu and Cv, the 2D space corresponding to the particular image has a width of W, the 2D space corresponding to the particular image has a height of H, the 2D location information for the particular point consists of a pair of coordinates u,v, the step of using the obtained 2D location information for the particular point to determine whether the point is located within the 2D space corresponding to the particular image comprises: determining if $|Cu-u| \leq W/2$; and determining if $|Cv-v| \leq H/2$, wherein the particular point is determined to be located within the 2D space corresponding to the particular image as a result of determining that $|Cu-u| \leq W/2$ and $|Cv-v| \leq H/2$.

In some embodiments, the step of obtaining the initial point cloud comprises: flying an aerial vehicle equipped with a camera on a path that circles the OOI, and, while the aerial vehicle is flying on the path, operating the camera to obtain images of the OOI. In some embodiments the aerial vehicle is an unmanned aerial vehicle (UAV).

In some embodiments, the step of, for each point included in the set of N points, determining a motion metric for the point using the K location identifiers for the point comprises determining a particular motion metric for a particular point included in the set of N point using the K location identifiers for the particular point, the K location identifiers for the particular point comprises a first location identifier for the particular point and a second location identifier for the particular point, the first location identifier for the particular point consist of a first pair of coordinates u1,v1, the second location identifier for the particular point consist of a second pair of coordinates u2,v2. The step of determining the particular motion metric (d) for the particular point comprises calculating $d=((u2-u1)^2+(v2-v1)^2)^{1/2}$. In some embodiments the K location identifiers for the particular point further comprises a third location identifier for the particular point, the third location identifier for the particular point consisting of a third pair of coordinates u3,v3, and the step of determining the particular motion metric for the particular point further comprises calculating $d=d+((u3-u2)^2+(v3-v2)^2)^{1/2}$.

In some embodiments the P location identifiers consists of a set of P coordinate pairs $x_i,y_i$ for i=1 to P, and the step of using the P location identifiers to estimate the center of the OOI (Cx,Cy) comprises calculating:

$$Cx = \frac{1}{P}\sum_{i=1}^{P} x_i, \text{ and}$$

$$Cy = \frac{1}{P}\sum_{i=1}^{P} y_i.$$

Figure 10:
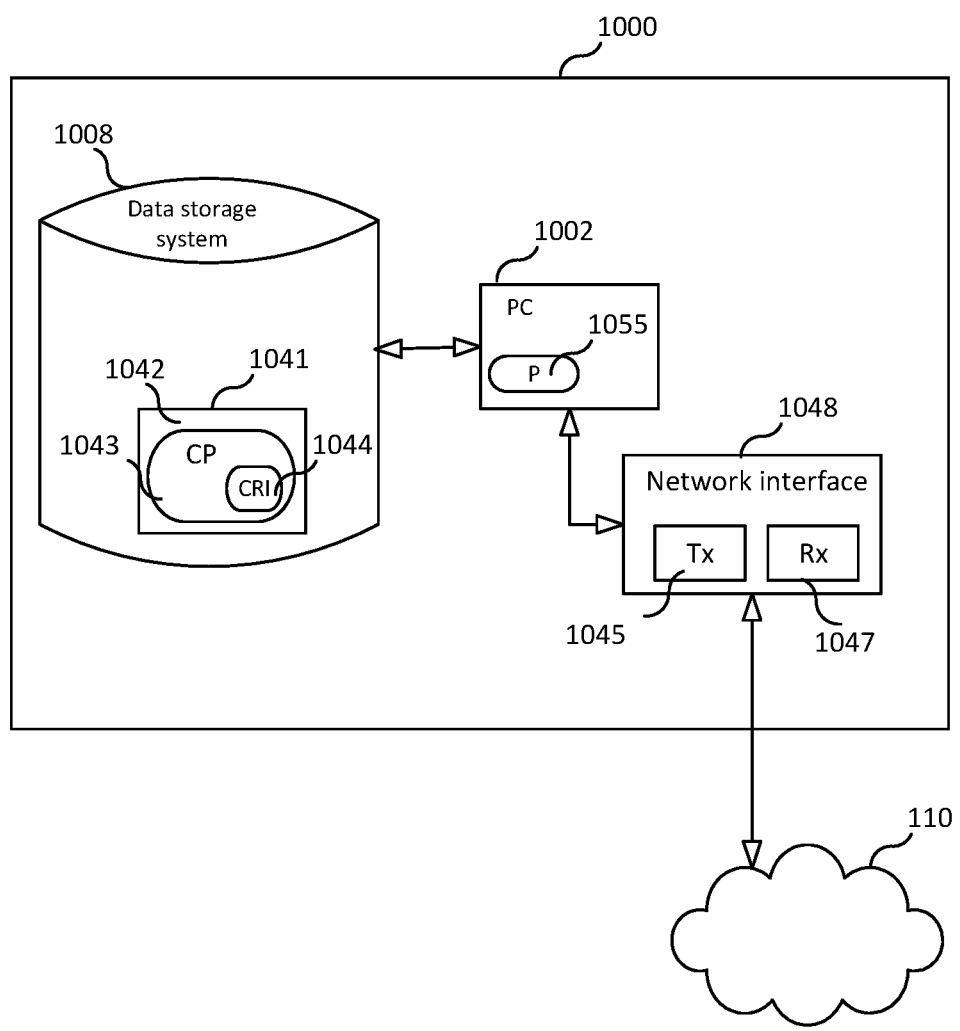
FIG. 10 is a block diagram of an apparatus according to some embodiments.

FIG. 10 is a block diagram of an apparatus 1000, according to some embodiments, for performing the methods disclosed herein. As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1000 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices.

In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI 1044 causes apparatus 1000 to perform steps described herein (e.g., steps described herein with reference to the flow charts). In other embodiments, apparatus 1000 may be configured to perform steps described herein without the need for code. That is, for example, PC 1002 may consist merely of one or more ASICs. Hence, the features of the embodiments described herein may be implemented in hardware and/or software. Accordingly, in one aspect there is provided a computer program 1043 comprising instructions 1044, which, when executed by processing circuitry of an apparatus, cause the apparatus to perform, for example, the above described method for estimating boundaries of an OOI. In one embodiment, there is provided a carrier containing the computer program 1043, wherein the carrier is one of an electronic signal, an optical signal, a radio signal, and a computer readable storage medium 1042.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for estimating boundaries of an object of interest (OOI), the method comprising:
   obtaining a first point cloud comprising a set of N points, each one of the N points having a location in a three-dimensional (3D) space;
   obtaining a set of K images, each of the K images comprising an image of the OOI from a unique position relative to the OOI, wherein, for each one of the K images, each point included in the set of N points has a location within a two-dimensional (2D) space corresponding to the image;
   for each point included in the set of N points, identifying, for each one of the K images, the point's location within the 2D space corresponding to the image, thereby obtaining, for each point included in the set of N points, K location identifiers, wherein each one of the K location identifiers identifies the point's location in one of the K images;
   for each point included in the set of N points, determining a motion metric for the point using the K location identifiers for the point, thereby obtaining N motion metrics;

using the N motion metrics, forming a subset of the N points, the subset containing P of the N points, where P=X×N, where X>0 and X<1;

for each point included in the subset of P points, obtaining a location identifier for the point, thereby obtaining P location identifiers;

using the P location identifiers to estimate a center of the OOI; and using the estimated center of the OOI to identify a boundary for the OOI.

2. The method of claim 1, wherein forming the subset of P points comprises determining the P points within the set of N points that have lowest motion metric.

3. The method of claim 1, wherein the P location identifiers consists of a set of P coordinate pairs $x_i, y_i$ for i=1 to P, and the step of using the P location identifiers to estimate the center of the OOI (Cx,Cy) comprises calculating:

$$Cx = \frac{1}{P}\sum_{i=1}^{P} x_i, \text{ and}$$

$$Cy = \frac{1}{P}\sum_{i=1}^{P} y_i.$$

4. The method of claim 1, wherein P=0.01×N.

5. A non-transitory computer readable storage medium storing a computer program comprising instructions which when executed by processing circuitry of an apparatus causes the apparatus to perform the method of claim 1.

6. The method of claim 1, wherein obtaining the N motion metrics comprises determining a particular motion metric for a particular point included in the set of N point using the K location identifiers for the particular point, the K location identifiers for the particular point comprises a first location identifier for the particular point and a second location identifier for the particular point, the first location identifier for the particular point consist of a first pair of coordinates u1,v1, the second location identifier for the particular point consist of a second pair of coordinates u2,v2, and the step of determining the particular motion metric for the particular point comprises calculating the motion metric using u1, u2, v1, and v2.

7. The method of claim 6, wherein calculating the motion metric using u1, u2, v1, and v2 comprises calculating u1−u2 and calculating v1−v2.

8. The method of claim 1, wherein, for each point included in the set of N points, the motion metric for the point indicates a cumulative projected distance that the point has moved between each image.

9. The method of claim 1, further comprising:

obtaining an initial point cloud comprising a set of M points; and truncating the set of M points to establish the set of N points, thereby creating the first point cloud.

10. The method of claim 9, wherein the step of truncating the set of M points comprises:

for each point included in the set of M points, determining, for each one of the K images, whether the point is located within the 2D space corresponding to the image; and removing from the set of M points all points that are not located within every one of the K 2D spaces.

11. The method of claim 10, wherein the step of, for each point included in the set of the M points, determining, for each one of the K images, whether the point is located within the 2D space corresponding to the image comprises: determining whether a particular point included in the set of M points is located within the 2D space corresponding to a particular image included in the set of K images, and the step of determining whether the particular point is located within the 2D space corresponding to the particular image comprises:

obtaining 3D location information specifying the location of the particular point in the 3D space;

obtaining camera pose information identifying a camera pose associated with the particular image;

obtaining intrinsic camera information, the intrinsic camera information comprising focal length information identifying a focal length;

based on the 3D location information, the camera pose information, and the intrinsic camera information, obtaining 2D location information for the particular point; and using the obtained 2D location information for the particular point to determine whether the particular point is located within the 2D space corresponding to the particular image.

12. The method of claim 11, wherein the 2D space corresponding to the particular image has a center point located at the coordinates Cu and Cv, the 2D space corresponding to the particular image has a width of W, the 2D space corresponding to the particular image has a height of H, the 2D location information for the particular point consists of a pair of coordinates u,v, the step of using the obtained 2D location information for the particular point to determine whether the point is located within the 2D space corresponding to the particular image comprises:

determining if |Cu−u|≤W/2; and determining if |Cv−v|≤H/2, wherein the particular point is determined to be located within the 2D space corresponding to the particular image as a result of determining that |Cu−u|≤W/2 and |Cv−v|≤H/2.

13. The method of claim 9, wherein the step of obtaining the initial point cloud comprises: flying an aerial vehicle equipped with a camera on a path that circles the OOI, and, while the aerial vehicle is flying on the path, operating the camera to obtain images of the OOI.

14. The method of claim 13, wherein the aerial vehicle is an unmanned aerial vehicle.

15. The method of claim 1, wherein the step of, for each point included in the set of N points, determining a motion metric for the point using the K location identifiers for the point comprises determining a particular motion metric for a particular point included in the set of N point using the K location identifiers for the particular point, the K location identifiers for the particular point comprises a first location identifier for the particular point and a second location identifier for the particular point, the first location identifier for the particular point consist of a first pair of coordinates u1,v1, the second location identifier for the particular point consist of a second pair of coordinates u2,v2, and the step of determining the particular motion metric (d) for the particular point comprises calculating $d=((u2-u1)^2+(v2-v1)^2)^{1/2}$.

16. The method of claim 15, wherein
the K location identifiers for the particular point further comprises a third location identifier for the particular point, the third location identifier for the particular point consisting of a third pair of coordinates u3, v3, and
the step of determining the particular motion metric for the particular point further comprises calculating $d=d+((u3-u2)^2+(v3-v2)^2)^{1/2}$.

17. An apparatus for estimating boundaries of an object of interest (OOI), the apparatus comprising:
processing circuitry; and
a memory, the memory containing instructions executable by the processing circuitry, wherein the apparatus is configured to perform a method comprising:
obtaining a first point cloud comprising a set of N points, each one of the N points having a location in a three-dimensional (3D) space;
obtaining a set of K images, each of the K images comprising an image of the OOI from a unique position relative to the OOI, wherein, for each one of the K images, each point included in the set of N points has a location within a two-dimensional (2D) space corresponding to the image;
for each point included in the set of N points, identifying, for each one of the K images, the point's location within the 2D space corresponding to the image, thereby obtaining, for each point included in the set of N points, K location identifiers, wherein each one of the K location identifiers identifies the point's location in one of the K images;
for each point included in the set of N points, determining a motion metric for the point using the K location identifiers for the point, thereby obtaining N motion metrics;
using the N motion metrics, forming a subset of the N points, the subset containing P of the N points, where $P=X\times N$, where $X>0$ and $X<1$;
for each point included in the subset of P points, obtaining a location identifier for the point, thereby obtaining P location identifiers;
using the P location identifiers to estimate a center of the OOI; and
using the estimated center of the OOI to identify a boundary for the OOI.

18. The apparatus of claim 17, wherein forming the subset of P points comprises determining the P points within the set of N points that have lowest motion metric.

19. The apparatus of claim 17, wherein the method further comprises:
obtaining an initial point cloud comprising a set of M points; and
truncating the set of M points to establish the set of N points, thereby creating the first point cloud.

20. The apparatus of claim 19, wherein the step of truncating the set of M points comprises:
for each point included in the set of M points, determining, for each one of the K images, whether the point is located within the 2D space corresponding to the image; and
removing from the set of M points all points that are not located within every one of the K 2D spaces.

* * * * *